US009134956B2

United States Patent
Yamashita et al.

(10) Patent No.: US 9,134,956 B2
(45) Date of Patent: Sep. 15, 2015

(54) IN-VEHICLE SYSTEM, VEHICLE CONTROL METHOD, AND VEHICLE CONTROL SYSTEM

(71) Applicants: Shuji Yamashita, Aichi (JP); Tetsuo Nishidai, Aichi (JP); Takahiro Inaguma, Aichi (JP); Yosuke Tomita, Aichi (JP)

(72) Inventors: Shuji Yamashita, Aichi (JP); Tetsuo Nishidai, Aichi (JP); Takahiro Inaguma, Aichi (JP); Yosuke Tomita, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 89 days.

(21) Appl. No.: 14/056,518

(22) Filed: Oct. 17, 2013

(65) Prior Publication Data
US 2014/0114504 A1 Apr. 24, 2014

(30) Foreign Application Priority Data
Oct. 18, 2012 (JP) .................................. 2012-231009

(51) Int. Cl.
*G06F 7/00* (2006.01)
*B60R 25/40* (2013.01)
*G07C 9/00* (2006.01)

(52) U.S. Cl.
CPC . *G06F 7/00* (2013.01); *B60R 25/40* (2013.01); *G07C 9/00309* (2013.01); *G07C 2009/00579* (2013.01)

(58) Field of Classification Search
None
See application file for complete search history.

(56) References Cited

U.S. PATENT DOCUMENTS

| 2006/0145836 | A1  | 7/2006 | Miyazaki |  |
|---|---|---|---|---|
| 2013/0041560 | A1* | 2/2013 | Bongiorno et al. | 701/48 |
| 2013/0211623 | A1* | 8/2013 | Thompson et al. | 701/2 |
| 2014/0172192 | A1* | 6/2014 | Kato | 701/2 |

FOREIGN PATENT DOCUMENTS

| JP | 2005-178666 A | 7/2005 |
| JP | 2007-30613 A | 2/2007 |
| JP | 2007-104868 A | 4/2007 |
| JP | 2007132085 A | 5/2007 |
| JP | 2008-503196 A | 1/2008 |
| JP | 2009102943 A | 5/2009 |
| JP | 2010132233 A | 6/2010 |
| JP | 2012-41709 A | 3/2012 |
| WO | 2005/122686 A2 | 12/2005 |

OTHER PUBLICATIONS

English Translation of JP 2007-132085.*
Office Action issued in corresponding Japanese Application No. 2012-231009 dated Oct. 2, 2014, and English translation thereof (10 pages).

* cited by examiner

*Primary Examiner* — Rami Khatib
(74) *Attorney, Agent, or Firm* — Osha Liang LLP

(57) ABSTRACT

An in-vehicle system has a control device that controls a vehicle, and a charging device provided in the vehicle, in which a portable terminal is chargeable. The charging device has a power supply part that supplies power to the portable terminal, and a communication part that communicates with the portable terminal when the portable terminal is installed on the charging device. The control device has an authentication part that authenticates first authentication information received by the communication part from the portable terminal, and a vehicle control part that controls whether to permit starting of the vehicle based on an authentication result of the first authentication information.

15 Claims, 8 Drawing Sheets

IN-VEHICLE SYSTEM, VEHICLE CONTROL METHOD, AND VEHICLE CONTROL SYSTEM

BACKGROUND OF THE INVENTION

1. Technical Field

The present invention relates to an in-vehicle system, a vehicle control method, and a vehicle control system, and particularly to an in-vehicle system, a vehicle control method, and a vehicle control system that enable an operation such as starting of a vehicle or locking/unlocking of a door of the vehicle to be performed using a general-purpose portable terminal.

2. Related Art

Conventionally, when a plurality of users use one vehicle, for example, a plurality of keys of the vehicle or a plurality of dedicated portable devices (for example, key fobs and the like) for the vehicle are prepared so that the keys and the dedicated portable devices are configured to be carried by the users.

In addition, conventionally, it has been proposed that a vehicle is accessible with an electronic key of another person by forwarding key information via a predetermined server (see Japanese Unexamined Patent Application Publication No. 2012-41709). Specifically, for example, after key information of an electronic key for the vehicle of a certain user A has been transmitted to a portable terminal of the user A through near-field wireless communication, the key information is transmitted from the portable terminal of the user A to the server. Further, after the key information has been transmitted from the server to the portable terminal of a user B, the key information is transmitted from the portable terminal of the user B to an electronic key of the user B through near-field wireless communication. Thereby, it is possible to use the vehicle of the user A using the electronic key of the user B.

Further, conventionally, a remote immobilizer system which releases a starting-inhibited state of a vehicle through wireless communication with a communication center has been proposed (for example, see Japanese Unexamined Patent Application Publication No. 2007-30613). In this system, a countermeasure when wireless communication between the communication center and the vehicle is disabled has been proposed. Specifically, when the wireless communication between the communication center and the vehicle is disabled, a predetermined release code is transmitted from the communication center to a portable telephone, and transmitted from the portable telephone to an immobilizer unit of the vehicle through wired or wireless communication. Thereby, even when the wireless communication between the communication center and the vehicle is disabled, the user can release the starting-inhibited state using the user's own portable telephone.

In addition, conventionally, identifier (ID) information is transmitted from the portable terminal such as the portable telephone to the vehicle through near-field wireless communication. When the acquired ID information is not consistent with ID information registered in the vehicle, a process of stopping supply of an engine starting permission signal to an engine control part has been proposed (for example, see Japanese Unexamined Patent Application Publication No. 2005-178666).

Further, conventionally, the installation of a non-contact charger for a portable telephone within a vehicle has been proposed (for example, see Japanese Unexamined Patent Application Publication No. 2007-104868).

In addition, conventionally, technology for charging a remote device via a holder or enabling communication between the remote device and the vehicle to be performed when a remote device such as a portable telephone or a personal digital assistant (PDA) has been disposed in the holder provided within the vehicle interior has been proposed (for example, see Japanese Unexamined Patent Application Publication (Translation of PCT Application) No. 2008-503196.

SUMMARY

One or more embodiments of the present invention enables a vehicle to be easily operated using a general-purpose portable terminal.

In accordance with one or more embodiments of the present invention, there is provided an in-vehicle system including a control device which controls a vehicle and a charging device which is provided in the vehicle and in which a portable terminal is chargeable, wherein the charging device includes: a power supply part that supplies power to the portable terminal; and a communication part that communicates with the portable terminal when the portable terminal is installed on the charging device, and wherein the control device includes: an authentication part that authenticates first authentication information received by the communication part from the portable terminal; and a vehicle control part that controls whether to permit starting of the vehicle based on an authentication result of the first authentication information.

In the in-vehicle system according to one or more embodiments of the present invention, when the portable terminal is installed according to the charging device, power is supplied to the portable terminal, communication with the portable terminal is performed, the first authentication information received from the portable terminal is authenticated according to the control device, and whether to permit the starting of the vehicle is controlled based on an authentication result of the first authentication information.

Accordingly, it is possible to easily perform an operation of the vehicle, particularly, starting of the vehicle, using a general-purpose portable terminal.

The control device, for example, includes an electronic control unit (ECU). This portable terminal, for example, includes a portable telephone, a smartphone, a PDA, a portable video player, a portable music player, a digital camera, an integrated circuit (IC) card and the like. The charging device, for example, includes a contact or non-contact charger. The power supply part, for example, includes a power supply device including a power source or a control device which controls supply of power from an outside. The communication part, for example, includes a communication device which performs wired or wireless communication. The authentication part and the vehicle control part, for example, include a processor such as a central processing unit (CPU).

In the case where the authentication of the first authentication information has succeeded, the vehicle control part can be caused to output a command to start the vehicle when a predetermined operation has been performed on the vehicle.

Thereby, it is possible to start the vehicle according to an easy operation.

The control device can further include: a power supply control part that controls the presence or absence of supply of power from the power supply part to the portable terminal based on the authentication result of the first authentication information.

Thereby, it is possible to limit a chargeable portable terminal.

The power supply control part, for example, includes a processor such as a CPU.

The power supply control part can be caused to control power to be supplied from the power supply part to the portable terminal when the authentication of the first authentication information has succeeded before the vehicle is started, and control power to be supplied from the power supply part to the portable terminal regardless of the authentication result of the first authentication information after the vehicle is started.

Thereby, it is possible to limit the chargeable portable terminal before the vehicle is started and to prevent the chargeable portable terminal from being limited after the vehicle is started.

The control device can be caused to further include: a near-field wireless communication part that performs near-field wireless communication with the portable terminal, the authentication part can be caused to further authenticate the first authentication information received by the near-field wireless communication part from the portable terminal, and the vehicle control part can be caused to further control locking or unlocking of a door of the vehicle based on an authentication result of the first authentication information.

Thereby, it is possible to easily lock or unlock the door of the vehicle using the portable terminal.

The near-field wireless communication part, for example, includes a communication device which performs communication according to NFC or Bluetooth.

The control device can be caused to further include: a wireless communication part that wirelessly communicates with a dedicated portable device for the vehicle, the authentication part can be caused to further authenticate second authentication information received by the wireless communication part from the portable device, and the vehicle control part can be caused to further control whether to permit the starting of the vehicle based on an authentication result of the second authentication information.

Thereby, it is possible to easily start the vehicle using the portable device.

The wireless communication part includes, for example, a wireless device which performs wireless communication of a low frequency (LF) band or an ultrahigh frequency (UHF) band.

The vehicle control unit can be caused to limit a function of the vehicle when the vehicle has been started according to the first authentication information compared to when the vehicle has been started according to the second authentication information.

Thereby, it is possible to limit the available function of the vehicle when the vehicle is started using the portable terminal compared to when the vehicle is started using the portable device.

The power supply part can be caused to supply power to the portable terminal in a non-contact form, and the communication part can be caused to perform near-field wireless communication with the portable terminal.

Thereby, it is possible to more easily charge the portable terminal and start the vehicle using the portable terminal.

The communication part can be caused to further perform the near-field wireless communication with a dedicated portable terminal for the vehicle, the authentication part can be caused to further authenticate the second authentication information received by the communication part from the portable device, and the vehicle control part can be caused to further control whether to permit the starting of the vehicle based on an authentication result of the second authentication information.

Thereby, it is possible to easily start the vehicle using the portable device.

In accordance with one or more embodiments of the present invention, there is provided a method of controlling a vehicle including a control device which controls a vehicle and a charging device which is provided in the vehicle and in which a portable terminal is chargeable, the method including: communicating, by the charging device, with the portable terminal when the portable terminal has been installed and receiving authentication information from the portable terminal; authenticating, by the control device, the authentication information received by the charging device from the portable terminal; and controlling, by the control device, whether to permit starting of the vehicle based on an authentication result of the authentication information.

In a vehicle control method according to one or more embodiments of the present invention, when the portable terminal is installed according to the charging device, communication with the portable terminal is performed, authentication information received from the portable terminal is authenticated according to the control device, and whether to permit the starting of the vehicle is controlled based on an authentication result of the authentication information.

Accordingly, it is possible to easily perform an operation of the vehicle, particularly, the starting of the vehicle, using a general-purpose portable terminal.

The control device, for example, includes an ECU. This portable terminal, for example, includes a portable telephone, a smartphone, a PDA, a portable video player, a portable music player, a digital camera, an IC card and the like. The charging device, for example, includes a contact or non-contact charger.

In accordance with one or more embodiments of the present invention, there is provided a vehicle control system including a control device which controls a vehicle, a charging device which is provided in the vehicle and in which a portable terminal is chargeable, and a dedicated portable device for the vehicle, wherein the portable device includes: a first near-field wireless communication part that performs near-field wireless communication with the portable terminal and transmits first authentication information to the portable terminal, wherein the charging device includes: a power supply part that supplies power to the portable terminal; and a communication part that communicates with the portable terminal when the portable terminal is installed on the charging device, and wherein the control device includes: an authentication part that authenticates the first authentication information received by the communication part from the portable terminal; and a vehicle control part that controls whether to permit starting of the vehicle based on an authentication result of the first authentication information.

In a vehicle control system according to one or more embodiments of the present invention, when the first authentication information is transmitted from the portable device to the portable terminal and the portable terminal is installed according to the charging device, power is supplied to the portable terminal, communication with the portable terminal is performed, the first authentication information received from the portable terminal is authenticated according to the control device, and whether to permit the starting of the vehicle is controlled based on an authentication result of the first authentication information.

Accordingly, it is possible to easily perform an operation of the vehicle, particularly, the starting of the vehicle, using a general-purpose portable terminal.

The control device, for example, includes an ECU. This portable terminal, for example, includes a portable telephone, a smartphone, a PDA, a portable video player, a portable music player, a digital camera, an IC card and the like. The charging device, for example, includes a contact or non-contact charger. The portable device, for example, includes a dedicated key fob or the like for the vehicle. The first near-field wireless communication part, for example, includes a communication device which performs communication according to NEC or Bluetooth. The power supply part, for example, includes a power supply device including a power source or a control device which controls supply of power from the outside. The communication part, for example, includes a communication device which performs wired or wireless communication. The authentication part and the vehicle control part, for example, include a processor such as a CPU.

The vehicle control part can be caused to further control whether to permit starting of the vehicle based on an effective period or the effective number of times set in the first authentication information.

Thereby, it is possible to limit a period or the number of times of starting of the vehicle using the portable terminal.

The effective period or the effective number of times can be configured to be set when the first authentication information is transmitted from the portable device to the portable terminal.

The power supply part can be caused to supply power to the portable terminal in a non-contact form, and the communication part can be caused to perform near-field wireless communication with the portable terminal.

Thereby, it is possible to more easily charge the portable terminal and start the vehicle using the portable terminal.

In accordance with one or more embodiments of the present invention, there is provided an in-vehicle system including a control device which controls a vehicle and a charging device which is provided in the vehicle and in which a portable terminal is chargeable, wherein the charging device includes: a power supply part that supplies power to the portable terminal; and a communication part that communicates with the portable terminal when the portable terminal is installed on the charging device, and wherein the control device includes: an authentication part that authenticates authentication information received by the communication part from the portable terminal; and a communication control part that transmits and receives information to and from the portable terminal via the communication part when the authentication of the authentication information has succeeded.

In an in-vehicle system according to one or more embodiments of the present invention, when the portable terminal is installed according to the charging device, power is supplied to the portable terminal, communication with the portable terminal is performed, authentication information received from the portable terminal is authenticated by the control device, and information is transmitted and received to and from the portable terminal when the authentication of the authentication information has succeeded.

Accordingly, it is possible to easily perform an operation of the vehicle, particularly, supply of information from the portable terminal to the vehicle, and forwarding of vehicle information to the portable terminal using a general-purpose portable terminal. As information to be supplied from the portable terminal to the vehicle, for example, music information or map information (for updating a car navigation system) or the like, is assumed. In addition, as information to be forwarded from the vehicle to the portable terminal, for example, a failure diagnosis result, fuel consumption information, or the like is assumed.

The control device, for example, includes an ECU. This portable terminal, for example, includes a portable telephone, a smartphone, a PDA, a portable video player, a portable music player, a digital camera, an IC card and the like. The charging device, for example, includes a contact or non-contact charger. The power supply part, for example, includes a power supply device including a power source or a control device which controls supply of power from the outside. The communication part, for example, includes a communication device which performs wired or wireless communication. The authentication part and the vehicle control part, for example, include a processor such as a CPU.

According to one or more embodiments of the present invention, a vehicle can be easily operated using a general-purpose portable terminal.

DETAILED DESCRIPTION

Hereinafter, embodiments of the present invention will be described. Description will be given in the following order. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

1. Embodiments
2. Modified examples of Embodiments

<1. Embodiments>

[Configuration Example of Vehicle Control System 101]

Figure 1:
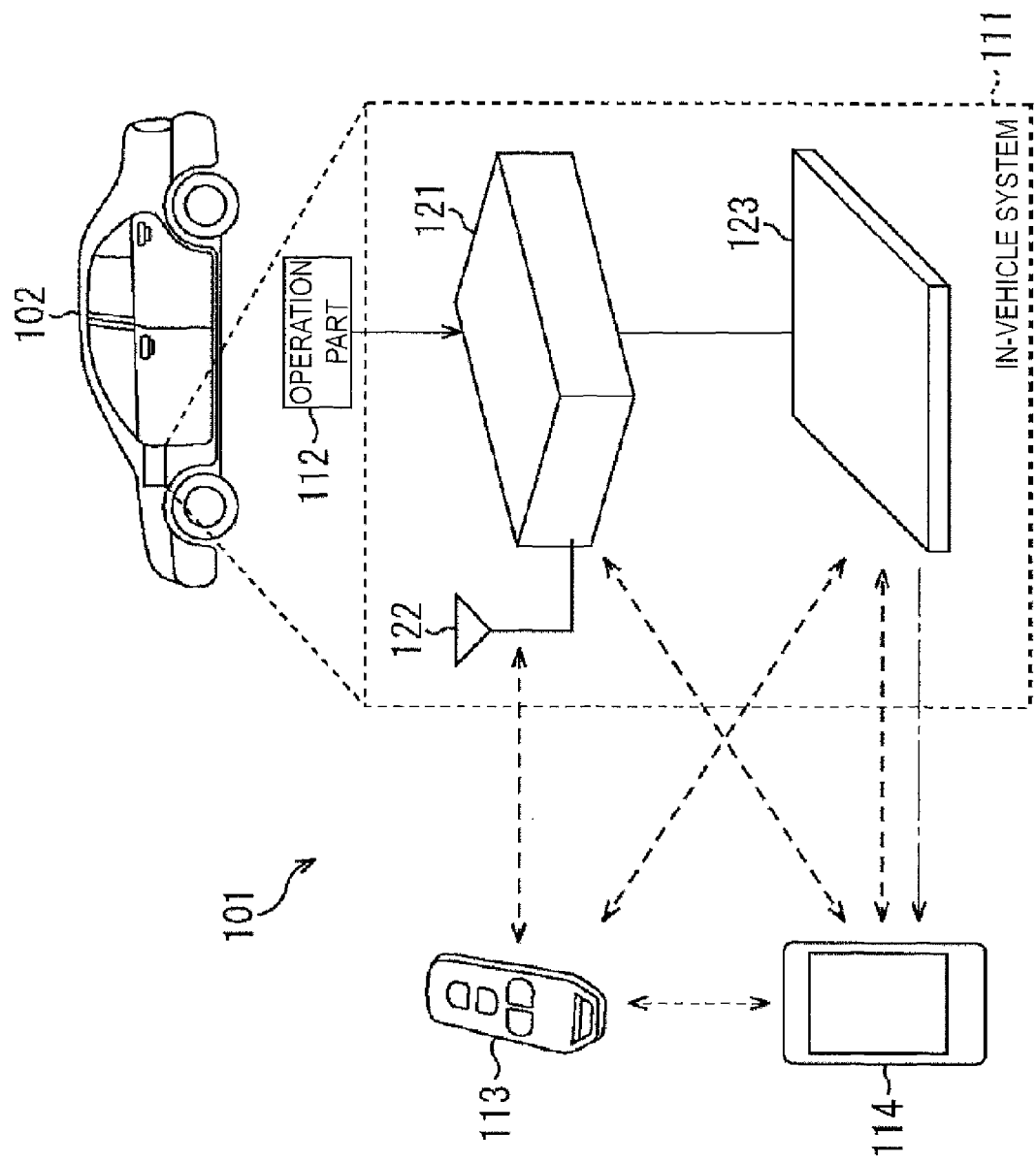
FIG. 1 is a diagram illustrating a vehicle control system according to one or more embodiments of the present invention.

FIG. 1 is a diagram illustrating a vehicle control system according to one or more embodiments of the present invention.

The vehicle control system 101 is an immobilizer which controls whether to permit starting of a vehicle 102 or a system which controls locking/unlocking of a door and the like. The vehicle control system 101 is configured to include an in-vehicle system 111, an operating part 112, a portable device 113, and a portable terminal 114.

The in-vehicle system 111 is provided in the vehicle 102 and configured to include an ECU 121, an antenna 122, and a charging pad 123.

The ECU 121 controls the immobilizer of the vehicle 102 or the locking/unlocking of the door and the like. In addition, the ECU 121 wirelessly communicates with the portable device 113 via the antenna 122. Further, the ECU 121 performs near-field wireless communication with the portable terminal 114 according to near field communication (NFC) or Bluetooth (registered trademark). In addition, the ECU 121 is connected to the charging pad 123 through a dedicated line, and controls the supply of charging power of the charging pad 123 and the near-field wireless communication according to NFC or Bluetooth.

The operating part 112 includes an operating member which performs various operations of the vehicle 102. For example, the operating part 112 includes a button provided in the vicinity of a door handle or a door of the vehicle 102, a starting switch for use in the starting of the vehicle 102 and the like. The operating part 112 supplies information representing operation contents to the ECU 121.

The charging pad 123, for example, includes a non-contact charger which performs wireless power feeding using electromagnetic induction or the like. For example, it is possible to charge a battery of the portable device 113 or the portable terminal 114 in a non-contact form by merely placing the portable device 113 or the portable terminal 114 on the charging pad 123. In addition, the charging pad 123 performs near-field wireless communication according to NFC with the portable device 113 under control of the ECU 121. Further, the charging pad 123 performs near-field wireless communication according to NFC or Bluetooth with the portable terminal 114 under control of the ECU 121.

The portable device 113, for example, includes a dedicated key fob for use in the operation of the vehicle 102 and the like. The portable device 113 stores vehicle operation information including authentication information for authenticating the portable device 113 in the vehicle 102, and is used for operations such as keyless entry, passive entry, and passive start.

Here, keyless entry is a function of performing a remote operation of locking or unlocking the door of the vehicle 102 by operating the portable device 113 without using a physical key or operating the door. In addition, passive entry is a function of locking or unlocking the door when the portable device 113 has been detected in the vicinity of the door when a button or the like has been operated in the vicinity of the door handle or the door of the vehicle 102. Further, passive start is a function of releasing the starting limitation of the vehicle 102 and enabling the starting of the vehicle 102 through the immobilizer when the portable device 113 has been detected within the vehicle if the starting switch or the like within the vehicle has been pressed.

In addition, the portable device 113 performs the near-field wireless communication according to NFC with the portable terminal 114, and, for example, transmits vehicle operation information to the portable terminal 114.

The portable terminal 114 includes a general-purpose portable terminal capable of performing near-field wireless communication according to NFC and Bluetooth, for example, a portable telephone, a smartphone, a PDA (portable information terminal), a portable video player, a portable music player, a digital camera, an IC card and the like. Using the vehicle operation information acquired from the portable device 113, the portable terminal 114 can be used for the operations such as keyless entry, passive entry, and passive start as a substitute for the portable device 113.

[Configuration Example of in-Vehicle System 111]

Figure 2:
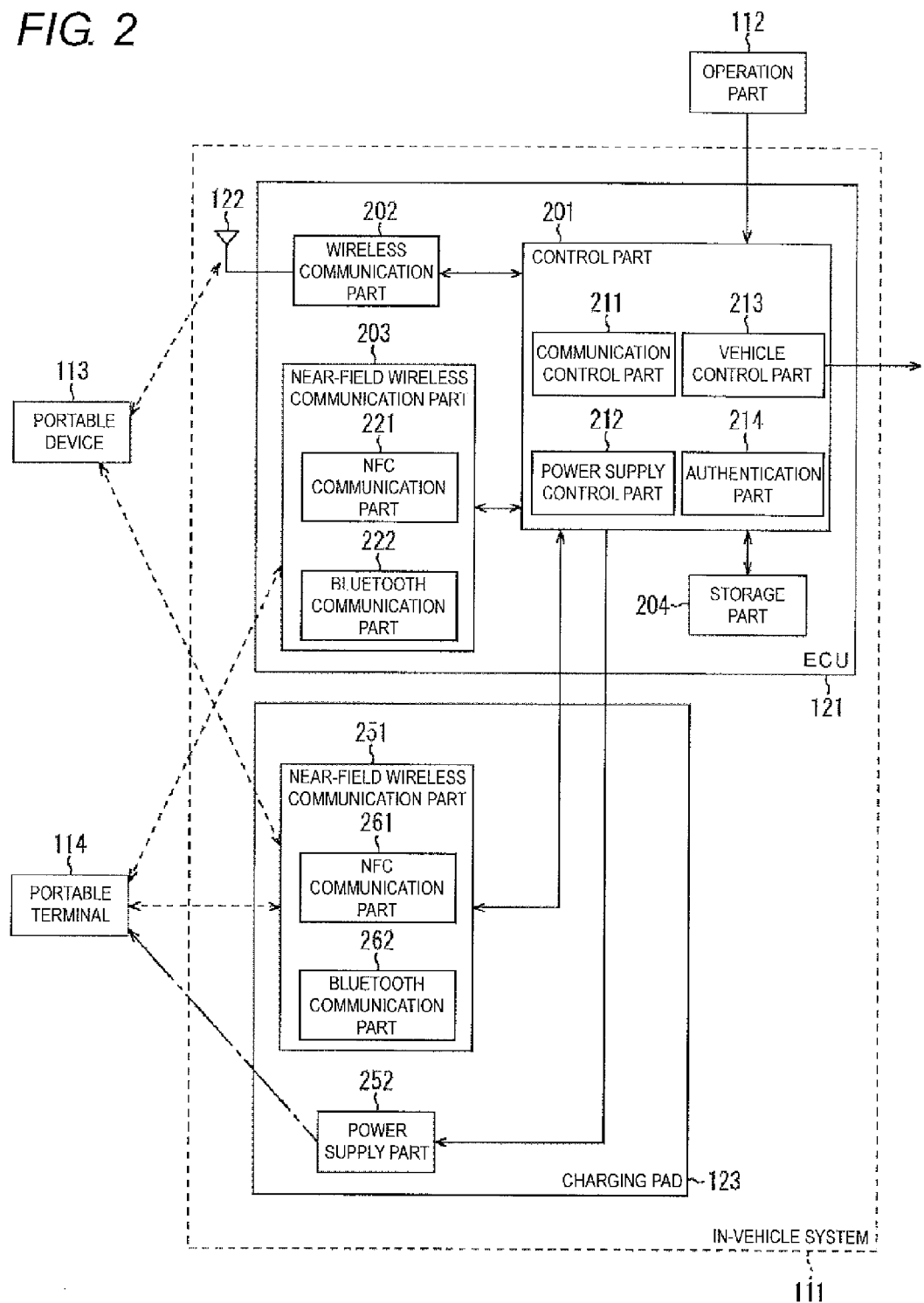
FIG. 2 is a block diagram illustrating a configuration example of a function of an in-vehicle system.

FIG. 2 is a block diagram illustrating a configuration example of functions of the ECU 121 and the charging pad 123 of the in-vehicle system 111.

The ECU 121 is configured to include a control part 201, a wireless communication part 202, a near-field wireless communication part 203, and a storage part 204.

The control part 201, for example, includes a processor such as a CPU (Central Processing Unit), and is configured to include a communication control part 211, a power supply control part 212, a vehicle control part 213, and an authentication part 214.

The communication control part 211 controls communication of the wireless communication part 202, the near-field wireless communication part 203, and a near-field wireless communication part 251 of the charging pad 123. In addition, the communication control part 211 supplies the control part 201 or each part of the vehicle 102 with information and the like acquired from the portable device 113 or the portable terminal 114 via the wireless communication part 202, the near-field wireless communication part 203, or the near-field wireless communication part 251. Further, the communication control part 211 acquires information to be transmitted to the portable device 113 or the portable terminal 114 from the control part 201 or each part of the vehicle 102, and supplies the acquired information to the wireless communication part 202, the near-field wireless communication part 203, or the near-field wireless communication part 251.

The power supply control part 212 controls the supply of a power source such as an accessory power source or an ignition power source of the vehicle 102. In addition, the power supply control part 212 controls the supply of charging power from a power supply part 252 of the charging pad 123.

The vehicle control part 213 controls each part of the vehicle 102 according to communication contents from the portable device 113 or the portable terminal 114 or operation contents of the operating part 112, or controls the execution of functions of keyless entry, passive entry, passive start, the immobilizer and the like by transmitting various commands to another ECU or the like.

The authentication part 214 authenticates authentication information included in various information or the like transmitted from the portable device 113 or the portable terminal 114. In addition, the authentication part 214 notifies each part of the control part 201 of an authentication result or transmits the authentication result to the portable device 113 or the portable terminal 114 via the communication control part 211 or the like.

Under control of the communication control part 211, the wireless communication part 202 performs a predetermined type of wireless communication with the portable device 113 via the antenna 122, and transmits and receives various information and the like to and from the portable device 113. For example, wireless communication of an LF band is used in communication from the wireless communication part 202 to the portable device 113, and wireless communication of a UHF band is used in communication from the portable device 113 to the wireless communication part 202.

The near-field wireless communication part 203 is configured to include an NFC communication part 221 and a Bluetooth communication part 222.

Under control of the communication control part 211, the NFC communication part 221 performs NFC communication with the portable terminal 114, and transmits and receives various information and the like to and from the portable terminal 114.

Under control of the communication control part 211, the Bluetooth communication part 222 performs Bluetooth communication with the portable terminal 114, and transmits and receives various information and the like to and from the portable terminal 114.

The storage part 204 stores authentication information and the like for authenticating the portable device 113 or the portable terminal 114. The authentication information, for example, includes ID information and the like unique to the vehicle 102. In addition, the storage part 204, for example, stores a control program and the like for the control part 201 to execute a process.

The charging pad 123 is configured to include the near-field wireless communication part 251 and the power supply part 252.

The near-field wireless communication part 251 is configured to include an NFC communication part 261 and a Bluetooth communication part 262.

Under control of the communication control part 211, the NFC communication part 261 performs NFC communication with the portable device 113 or the portable terminal 114, and transmits and receives various information and the like to and from the portable device 113 or the portable terminal 114.

Under control of the communication control part 211, the Bluetooth communication part 262 performs Bluetooth communication with the portable terminal 114, and transmits and receives various information and the like to and from the portable terminal 114.

Under control of the power supply control part 212, the power supply part 252 supplies charging power to the portable terminal 114 or the like.

[Configuration Example of Portable Device 113]

Figure 3:
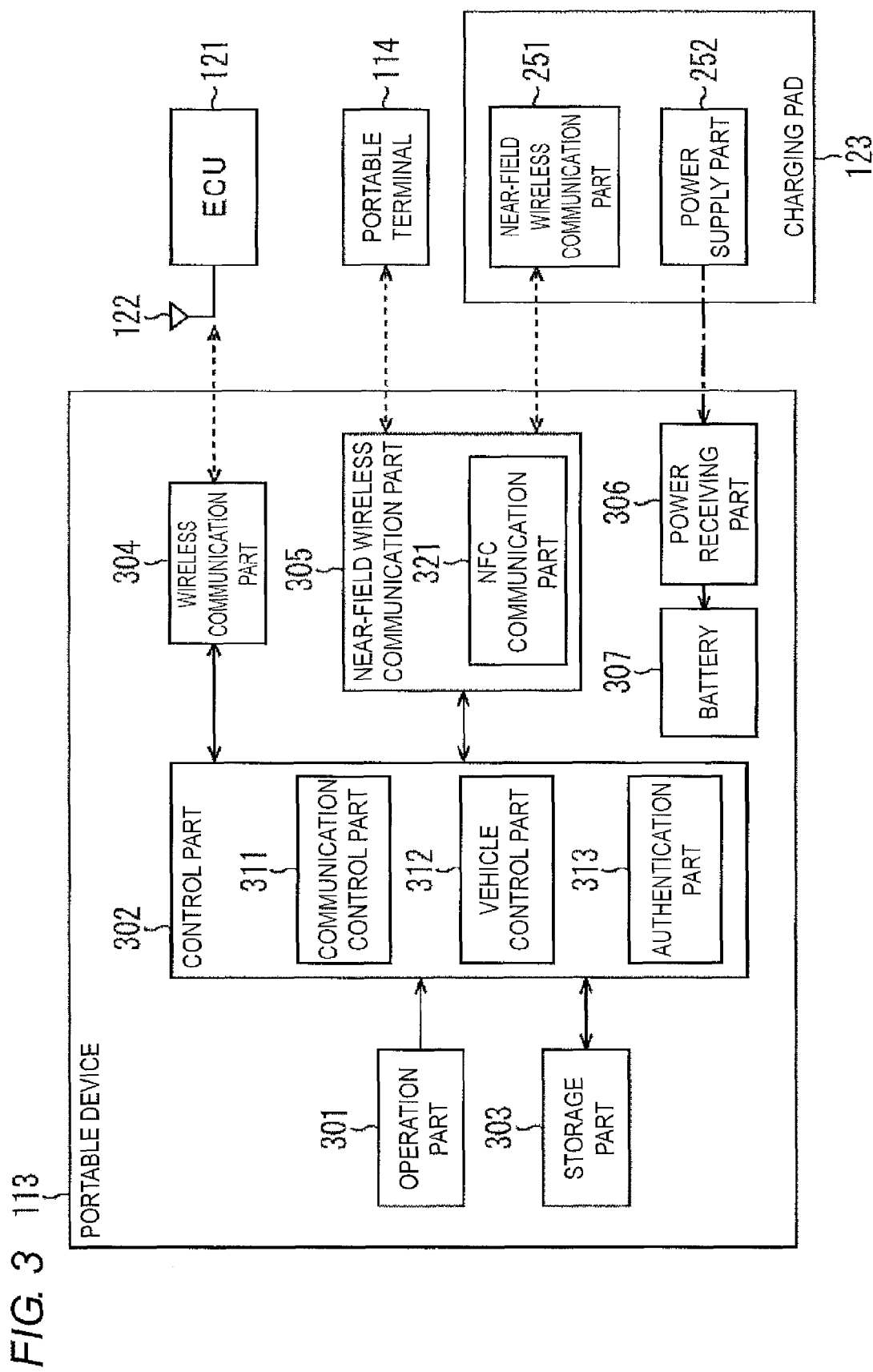
FIG. 3 is a block diagram illustrating a configuration example of a function of a portable device.

FIG. 3 illustrates the configuration example of the function of the portable device 113. The portable device 113 is configured to include an operating part 301, a control part 302, a storage part 303, a wireless communication part 304, a near-field wireless communication part 305, a power reception part 306, and a battery 307.

The operating part 301, for example, includes an operating member such as a switch or a button. The operating part 301 supplies information representing operation contents to the control part 302.

The control part 302, for example, includes a processor such as a CPU, and is configured to include a communication control part 311, a vehicle control part 312, and an authentication part 313.

The communication control part 311 controls communication of the wireless communication part 304 and the near-field wireless communication part 305. In addition, the communication control part 311 supplies information and the like acquired from the portable terminal 114, the ECU 121, or the charging pad 123 to each part of the control part 302 via the wireless communication part 304 or the near-field wireless communication part 305. Further, the communication control part 311 acquires information and the like transmitted to the portable terminal 114, the ECU 121, or the charging pad 123 from each part of the control part 302, and supplies the acquired information to the wireless communication part 304 or the near-field wireless communication part 305.

The vehicle control part 312, for example, performs transmission and reception of information and the like necessary to execute functions of keyless entry, passive entry, passive start and the like to and from the ECU 121 via the communication control part 311 and the wireless communication part 304. In addition, the vehicle control part 312, for example, performs transmission and reception of information and the like necessary to execute the passive start to and from the charging pad 123 via the communication control part 311 and the near-field wireless communication part 305.

The authentication part 313 performs an authentication process with the portable terminal 114 via the communication control part 311 and the near-field wireless communication part 305.

The storage part 303 stores vehicle operation information for use in the operation of the vehicle 102, a password for use in authentication of the portable terminal 114 and the like. In addition, the storage part 303, for example, stores a control program and the like for the control part 302 to execute the process.

Under control of the communication control part 311, the wireless communication part 304 performs a predetermined type of wireless communication with the ECU 121 and performs transmission and reception of various information and the like to and from the ECU 121.

The near-field wireless communication part 305 is configured to include an NEC communication part 321.

Under control of the communication control part 211, the NFC communication part 321 performs NFC communication with the portable terminal 114 or the charging pad 123, and performs transmission and reception of various information and the like to and from the portable terminal 114 or the charging pad 123.

The power reception part 306 receives power supplied through electromagnetic induction or the like from the power supply part 252 of the charging pad 123, and charges the battery 307 with the received power. Thereby, it is possible to charge the battery 307 by merely placing the portable device 113 on the charging pad 123.

The battery 307 supplies power to each part of the portable device 113.

[Configuration Example of Portable Terminal 114]

Figure 4:
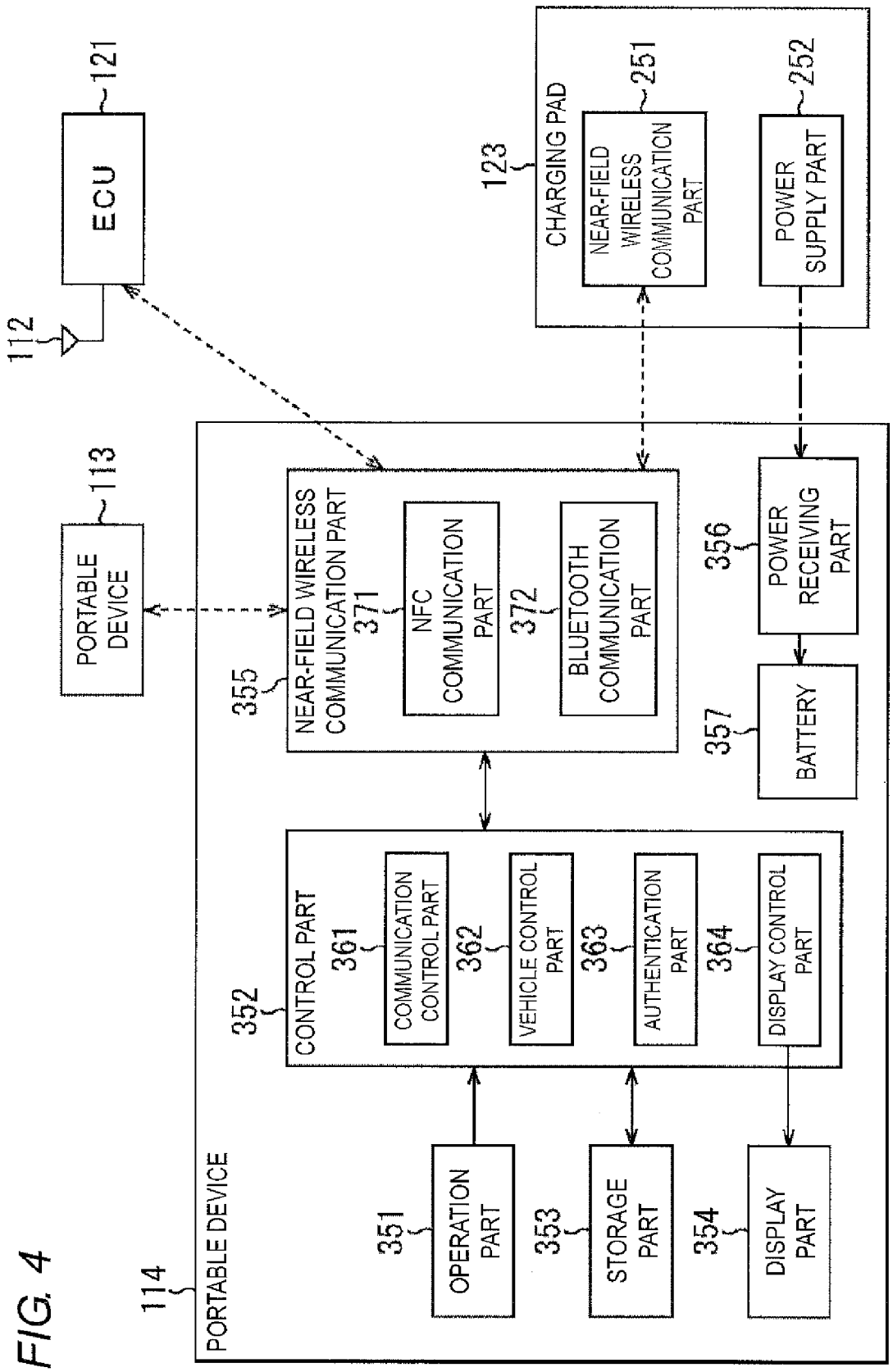
FIG. 4 is a block diagram illustrating a configuration example of a function of a portable terminal.

FIG. 4 illustrates the configuration example of the function of the portable terminal 114. The portable terminal 114 is configured to include an operating part 351, a control part 352, a storage part 353, a display part 354, a near-field wireless communication part 355, a power reception part 356, and a battery 357.

The operating part 351, for example, includes operating members such as a touch panel, a switch, a button, and a keyboard, an input unit for enabling a voice command according to voice recognition to be inputted and the like. The operating part 351 supplies information representing operation contents to the control part 352.

The control part 352, for example, includes a processor such as a CPU, and is configured to include a communication control part 361, a vehicle control part 362, an authentication part 363, and a display control part 364.

The communication control part 361 controls communication of the near-field wireless communication part 355. In addition, the communication control part 361 supplies information and the like acquired from the portable device 113, the ECU 121, or the charging pad 123 to each part of the control part 352 via the near-field wireless communication part 355. Further, the communication control part 361 acquires information and the like transmitted to the portable device 113, the ECU 121, or the charging pad 123 from each part of the control part 352, and supplies the acquired information to the near-field wireless communication part 355.

The vehicle control part 362, for example, performs transmission and reception of information and the like necessary to execute the functions such as keyless entry, passive entry and passive start via the communication control part 361 and the near-field wireless communication part 355 with the ECU 121 or the charging pad 123. In addition, the vehicle control part 362 receives vehicle operation information from the portable device 113 via the communication control part 361 and the near-field wireless communication part 355, and causes the storage part 353 to store the received information.

The authentication part 363 performs an authentication process with the portable terminal 114 via the communication control part 311 and the near-field wireless communication part 355.

The display control part 364 controls a screen display according to the display part 354.

The storage part 353 stores vehicle operation information of the vehicle 102 acquired from the portable device 113, a password for use in authentication of the portable terminal 114 by the portable device 113 and the like. In addition, the storage part 353, for example, stores a control program and the like for the control part 352 to execute the process.

The display part 354, for example, includes various display devices such as a liquid crystal display (LCD) and an organic EL display.

The near-field wireless communication part 355 is configured to include an NFC communication part 371 and a Bluetooth communication part 372.

Under control of the communication control part 361, the NFC communication part 371 performs NFC communication with the portable device 113, the ECU 121, or the charging pad 123, and performs transmission and reception of various information and the like to and from the portable device 113, the ECU 121, or the charging pad 123.

Under control of the communication control part 361, the Bluetooth communication part 372 performs Bluetooth communication with the ECU 121 or the charging pad 123, and performs transmission and reception of various information and the like to and from the ECU 121 or the charging pad 123.

The power reception part 356 receives power supplied through electromagnetic induction or the like from the power supply part 252 of the charging pad 123, and charges the battery 307 with the received power. Thereby, it is possible to charge the battery 357 only by placing the portable terminal 114 on the charging pad 123.

The battery 357 supplies power to each part of the portable terminal 114.

[Process of Vehicle Control System 101]

Next, the process of the vehicle control system 1001 will be described with reference to FIGS. 5 to 8.

(Process when vehicle operation information is forwarded from portable device 113 to portable terminal 114)

Figure 5:
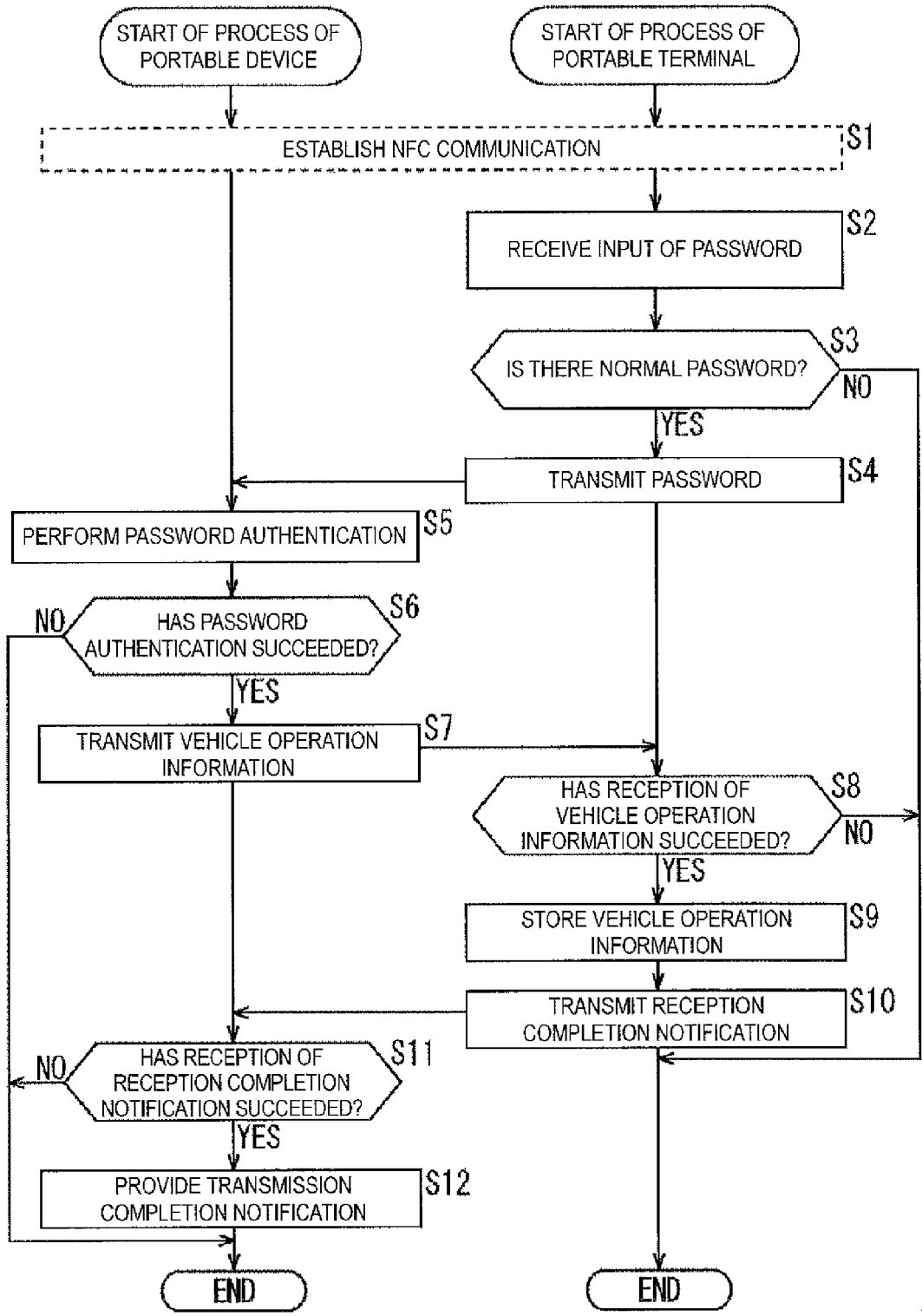
FIG. 5 is a flowchart illustrating a process when vehicle operation information is forwarded from the portable device to the portable terminal.

First, the process when the vehicle operation information is forwarded from the portable device 113 to the portable terminal 114 will be described with reference to the flowchart in FIG. 5. This process is started when the portable device 113 and the portable terminal 114 are in the vicinity of a communicable range of NFC.

In step S1, the NFC communication part 321 of the portable device 113 and the NFC communication part 371 of the portable terminal 114 establish NFC communication based on a predetermined protocol. In the establishment of the NFC communication, for example, it is checked whether the portable device 113 and the portable terminal 114 are devices capable of performing communication with each other.

In step S2, the portable terminal 114 receives an input of a password. For example, when the user has performed a predetermined operation using the operating part 351, the display part 354 displays an input screen of the password under control of the display control part 364. The user inputs the password according to a password input screen using the operating part 351, and the authentication part 363 acquires the input password.

In step S3, the authentication part 363 of the portable terminal 114 determines whether the input password is a normal password. When the password inputted by the user is consistent with a normal password stored in the storage part 353, the authentication part 363 determines that the inputted password is the normal password, and the process proceeds to step S4.

In step S4, the authentication part 363 of the portable terminal 114 transmits the password to the portable device 113 via the communication control part 361 and the NFC communication part 371.

In step S5, the portable device 113 performs password authentication. Specifically, the authentication part 313 of the portable device 113 receives a password from the portable terminal 114 via the NFC communication part 321 and the communication control part 311. The authentication part 313 matches the received password against a password for authenticating the portable terminal 114 stored in the storage part 303.

In step S6, the authentication part 313 of the portable device 113 determines whether the password authentication has succeeded. When a matching result indicates that the received password is consistent with the password stored in the storage part 303, the authentication part 313 determines that the password authentication has succeeded, and the process proceeds to step S7.

In step S7, the vehicle control part 312 of the portable device 113 transmits vehicle operation information stored in the storage part 353 to the portable terminal 114 via the communication control part 311 and the NFC communication part 321.

In step S8, the portable terminal 114 determines whether the reception of the vehicle operation information has succeeded. Specifically, when the vehicle operation information has been transmitted from the portable device 113, the vehicle control part 362 of the portable terminal 114 receives the vehicle operation information via the NFC communication part 371 and the communication control part 361. When the vehicle operation information has been received within a predetermined time after the password has been transmitted in step S4, the vehicle control part 362 determines that the reception of the vehicle operation information has succeeded. Thereafter, the process proceeds to step S9.

In step S9, the vehicle control part 362 of the portable terminal 114 causes the storage part 303 to store the vehicle operation information.

In step S10, the vehicle control part 362 of the portable terminal 114 transmits a reception completion notification to the portable device 113 via the communication control part 361 and the NFC communication part 371.

Thereafter, the process of the portable terminal 114 ends.

In step S11, the portable device 113 determines whether the reception of the reception completion notification has succeeded. Specifically, when the reception completion notification has been transmitted from the portable terminal 114, the vehicle control part 312 of the portable device 113 receives the reception completion notification via the NFC communication part 321 and the communication control part 311. When the reception completion notification has been received within a predetermined time after the vehicle operation information has been transmitted in step S7, the vehicle control part 312 determines that the reception of the reception completion notification has succeeded. Thereafter, the process proceeds to step S12.

In step S12, the portable device 113 provides a transmission completion notification. For example, the portable device 113 notifies the user that the transmission of the vehicle operation information has been completed by turning on or off a light emitting diode (LED) (not illustrated) in a predetermined color or pattern.

Thereafter, the process of the portable device 113 ends.

On the other hand, in step S11, the vehicle control part 312 of the portable device 113 determines that the reception of the reception completion notification has failed when the reception completion notification has not been received within a predetermined time after the transmission of the vehicle operation information has been performed in step S7. Thereafter, the process of step S12 is skipped and the process of the portable device 113 ends.

Even when the reception of the reception completion notification has failed in the portable device 113, the vehicle operation information is effective when the portable terminal 114 has successfully received the vehicle operation information.

In addition, when the received password is not consistent with the password stored in the storage part 303 or when the password has not been received from the portable terminal 114 within a predetermined time after the NFC communication has been established, the authentication part 313 of the portable device 1113 determines that the password authentication has failed in step S6. Thereafter, the process of steps S7, S11, and S12 is skipped, and the process of the portable device 113 ends.

Further, in step S8, the vehicle control part 362 of the portable terminal 114 determines that the reception of the vehicle operation information has failed when the vehicle operation information has not been received within a predetermined time after the transmission of the password has been transmitted in step S4. Thereafter, the process of steps S9 and S10 is skipped, and the process of the portable terminal 114 ends.

In addition, in step S3, the authentication part 363 of the portable terminal 114 determines that the user-input password is not a normal password when the user-input password is not consistent with the password stored in the storage part 353. Thereafter, the process of steps S4 and S8 to S10 is skipped, and the process of the portable terminal 114 ends without forwarding the vehicle operation information.

In this manner, it is possible to forward the vehicle operation information from the portable device 113 to the portable terminal 114 through only an easy operation of inputting the password by causing the portable device 113 and the portable terminal 114 to be in the vicinity of each other.

(Process when Unlocking or Locking of Door of Vehicle 102 is Performed Using Portable Terminal 114)

Figure 6:
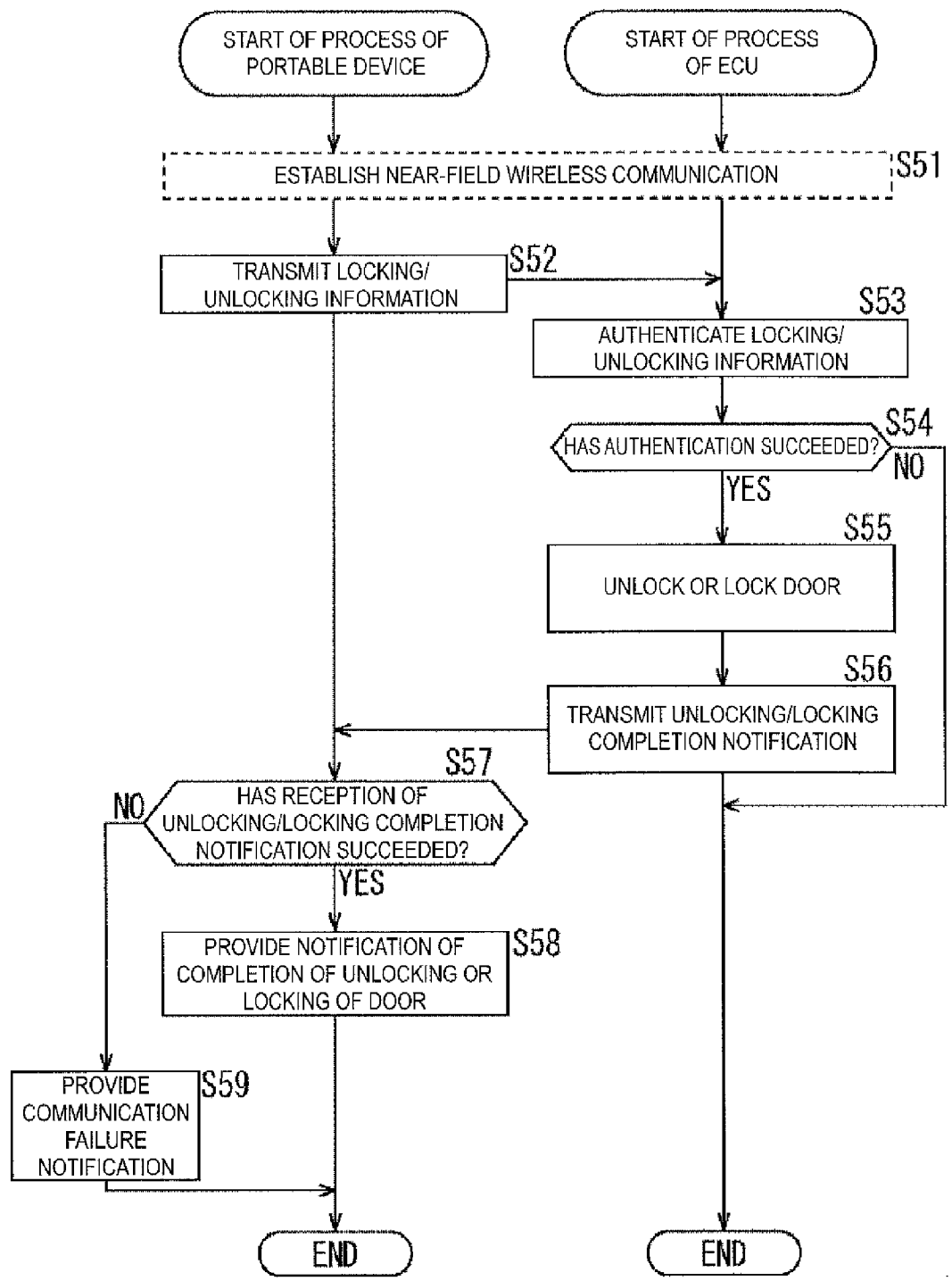
FIG. 6 is a flowchart illustrating a process when a door of a vehicle is locked or unlocked using the portable terminal.

Next, the process when the unlocking or locking of the door of the vehicle 102 is performed using the portable terminal 114 will be described with reference to the flowchart in FIG. 6. For example, the user operates the operating part 351 of the portable terminal 114, so that the above-described process causes the display part 354 to display an operation screen for performing the unlocking or locking of the door of the vehicle 102 and is started when a command to unlock or lock the door has been inputted according to the operation screen.

The portable terminal 114 may or may not be configured to distinguish unlocking and locking operations of the door. In the latter case, for example, the same operation serves as the unlocking operation when the door is locked and serves as the locking operation when the door is unlocked.

In step S51, the near-field wireless communication part 355 of the portable terminal 114 and the near-field wireless communication part 203 of the ECU 121 establish near-field wireless communication. At this time, a communication scheme of either the NFC communication or the Bluetooth communication may be used. Alternatively, a condition such as a distance between the portable terminal 114 and the ECU 121 or a communication scheme to be used by the user's operation may be selected. Hereinafter, the case in which the portable terminal 114 and the ECU 121 perform Bluetooth communication will be described.

In step S52, the portable terminal 114 transmits locking/unlocking information. Specifically, the vehicle control part 362 of the portable terminal 114 generates a command to lock/unlock the door of the vehicle 102 and locking/unlocking information including vehicle operation information. The vehicle operation information included in the locking/unlocking information is acquired from the portable device 113 according to the process described above with reference to FIG. 5, and stored in the storage part 353. The vehicle control part 362 transmits the locking/unlocking information to the ECU 121 via the communication control part 361 and the Bluetooth communication part 372.

When the operations of the locking and the unlocking of the door are distinguished in the portable terminal 114, a command indicated by the user's operation is included in a command to unlock or lock the door. On the other hand, when the operations of the locking and the unlocking of the door are not distinguished in the portable terminal 114, a command common to the unlocking and locking of the door is included in the locking/unlocking information.

In step S53, the ECU 121 authenticates locking/unlocking information. Specifically, the communication control part 211 receives the locking/unlocking information from the portable terminal 114 via the Bluetooth communication part 222, and supplies the received locking/unlocking information to the vehicle control part 213 and the authentication part 214. The authentication part 214 matches the authentication information included in the vehicle operation information within the locking/unlocking information against normal authentication information stored in the storage part 204.

In step S54, the authentication part 214 of the ECU 121 determines whether the authentication has succeeded. When a matching result indicates that the authentication information received from the portable terminal 114 is consistent with the normal authentication information stored in the storage part 204, the authentication part 214 determines that the authentication has succeeded and the process proceeds to step S55.

In step S55, the vehicle control part 213 of the ECU 121 unlocks or locks the door. Specifically, the vehicle control part 213 unlocks or locks the door of the vehicle 102 by controlling an actuator for unlocking or locking the door of the vehicle 102 and the like.

When the unlocking command and the locking command of the door are distinguished, the vehicle control part 213 unlocks or locks the door based on the command. On the other hand, when the unlocking command and the locking command of the door are not distinguished, the vehicle control part 213 performs an unlocking process if the door is locked and performs a locking process if the door is unlocked.

In addition, the vehicle control part 213 may be configured to directly control an actuator which locks and unlocks the door and the like, and to perform indirect control by transmitting a command to a separate ECU which controls the actuator and the like.

In step S56, the vehicle control part 213 transmits the unlocking completion notification or the locking completion notification via the communication control part 211 and the Bluetooth communication part 222.

Thereafter, the process of the ECU 121 ends.

In step S57, the portable terminal 114 determines whether the reception of the unlocking completion notification or the locking completion notification has succeeded. Specifically, when the unlocking completion notification or the locking completion notification has been transmitted from the ECU 121, the vehicle control part 362 of the portable terminal 114 receives the unlocking completion notification or the locking completion notification via the Bluetooth communication part 372 and the communication control part 361. When the unlocking completion notification or the locking completion notification has been received within a predetermined time after the transmission of the locking/unlocking information has been performed in step S52, the vehicle control part 362 determines that the reception of the unlocking completion notification or the locking completion notification has succeeded and the process proceeds to step S58.

In step S58, the display part 354 of the portable terminal 114 displays a predetermined screen under control of the display control part 364, and provides a notification of completion of the unlocking or locking of the door of the vehicle 102.

Thereafter, the process of the portable terminal 114 ends.

On the other hand, in step S57, when the unlocking completion notification or the locking completion notification has not been received within a predetermined time after the transmission of the locking/unlocking information has been performed in step S52, the vehicle control part 362 of the portable terminal 114 determines that the reception of the unlocking completion notification or the locking completion notification has failed. Thereafter, the process proceeds to step S59.

In step S59, the display part 354 of the portable terminal 114 displays a predetermined screen under control of the display control part 364, and provides a notification of a failure of communication with the vehicle 102 (ECU 121).

Thereafter, the process of the portable terminal 114 ends.

On the other hand, in step S54, the authentication part 214 of the ECU 121 determines that the authentication has failed when the authentication information received from the portable terminal 114 is not consistent with the normal authentication information stored in the storage part 204 or when the locking/unlocking information has not been received within a predetermined time. Thereafter, the process of steps S55 and S56 is skipped, and the process of the ECU 121 ends without unlocking or locking the door.

In this manner, it is possible to unlock or lock the door of the vehicle 102 through an easy operation using the portable terminal 114 instead of the portable device 113.

(Process when Starting of the Vehicle 102 is Enabled Using Portable Terminal 114)

Next, the process when the starting of the vehicle 102 is enabled using the portable terminal 114 will be described with reference to the flowchart in FIG. 7. For example, this process is started when the user places the portable terminal 114 on the charging pad 123.

In step S101, the near-field wireless communication part 355 of the portable terminal 114 and the near-field wireless communication part 251 of the charging pad 123 establish the near-field wireless communication. At this time, a communication scheme of either the NFC communication or the Bluetooth communication may be used. For example, in a state in which the portable terminal 114 has been placed on the charging pad, the portable terminal 114 is set to be in a communicable range of the NFC communication or the Bluetooth communication. Thereby, it is possible to establish the communication of the portable terminal 114 and the in-vehicle system 111 through the user's natural operation of placing the portable terminal 114 on the charging pad and prevent the execution of unnecessary communication unintended by the user. Hereinafter, the case in which the portable terminal 114 and the charging pad 123 perform NFC communication will be described.

In step S102, the portable terminal 114 transmits the vehicle operation information. Specifically, the vehicle control part 362 of the portable terminal 114 transmits the vehicle operation information acquired from the portable device 113 and stored in the storage part 353 according to the process described above with reference to FIG. 5 to the charging pad 123 via the communication control part 361 and the NFC communication part 371.

In step S103, the in-vehicle system 111 authenticates the vehicle operation information. Specifically, the communication control part 211 of the ECU 121 receives the vehicle operation information from the portable terminal 114 via the NFC communication part 261 of the charging pad 123, and supplies the received vehicle operation information to the vehicle control part 213 and the authentication part 214. The authentication part 214 matches the authentication information included in the vehicle operation information against the normal authentication information stored in the storage part 204.

In step S104, the authentication part 214 of the ECU 121 determines whether the authentication has succeeded. When a matching result indicates that the authentication information received from the portable terminal 114 is consistent with the normal authentication information stored in the storage part 204, the authentication part 214 determines that the authentication has succeeded, and the process proceeds to step S105.

In step S105, the vehicle control part 213 of the ECU 121 sets the vehicle 102 to a starting-enabled state. For example, the vehicle control part 213 sets the vehicle 102 to the starting-enabled state by releasing a starting limitation of the vehicle 102 through the immobilizer.

In step S106, the vehicle control part 213 of the ECU 121 transmits an immobilizer authentication communication success notification via the communication control part 211 and the NEC communication part 261 of the charging pad 123.

Thereafter, the process of the in-vehicle system 111 ends.

In step S107, the portable terminal 114 determines whether the reception of the immobilizer authentication communication success notification has succeeded. Specifically, when the immobilizer authentication communication success notification has been transmitted from the ECU 121, the vehicle control part 362 of the portable terminal 114 receives the immobilizer authentication communication success notification via the NFC communication part 371 and the communication control part 361. When the immobilizer authentication communication success notification has been received within a predetermined time after the transmission of the vehicle operation information has been performed in step S102, the vehicle control part 362 determines that the reception of the immobilizer authentication communication success notification has succeeded. Thereafter, the process proceeds to step S108.

In step S108, the display part 354 of the portable terminal 114 displays a predetermined screen under control of the display control part 364, and provides a notification indicating that the starting of the vehicle 102 has been permitted.

Thereafter, the process of the portable terminal 114 ends.

On the other hand, in step S107, when the immobilizer authentication communication success notification has not been received within the predetermined time after the transmission of the vehicle operation information has been performed in step S102, the vehicle control part 362 determines that the reception of the immobilizer authentication communication success notification has failed. Thereafter, the process proceeds to step S109.

In step S109, the display part 354 of the portable terminal 114 displays a predetermined screen under control of the display control part 364, and provides a notification indicating that the communication of the vehicle 102 (ECU 121) has failed.

Thereafter, the process of the portable terminal 114 ends.

On the other hand, in step S104, the authentication part 214 of the ECU 121 determines that the authentication has failed when the authentication information received from the portable terminal 114 is not consistent with the normal authentication information stored in the storage part 204 or when the vehicle operation information has not been received within a predetermined time. Thereafter, the process of steps S105 and S106 is skipped and the process of the in-vehicle system 111 ends in a state in which the starting of the vehicle 102 is not permitted but inhibited.

In this manner, the vehicle 102 can be set to the starting-enabled state only by placing the portable terminal 114 having the vehicle operation information on the charging pad 123.

(Process of in-Vehicle System 111 when Starting Switch has been Operated)

Figure 8:
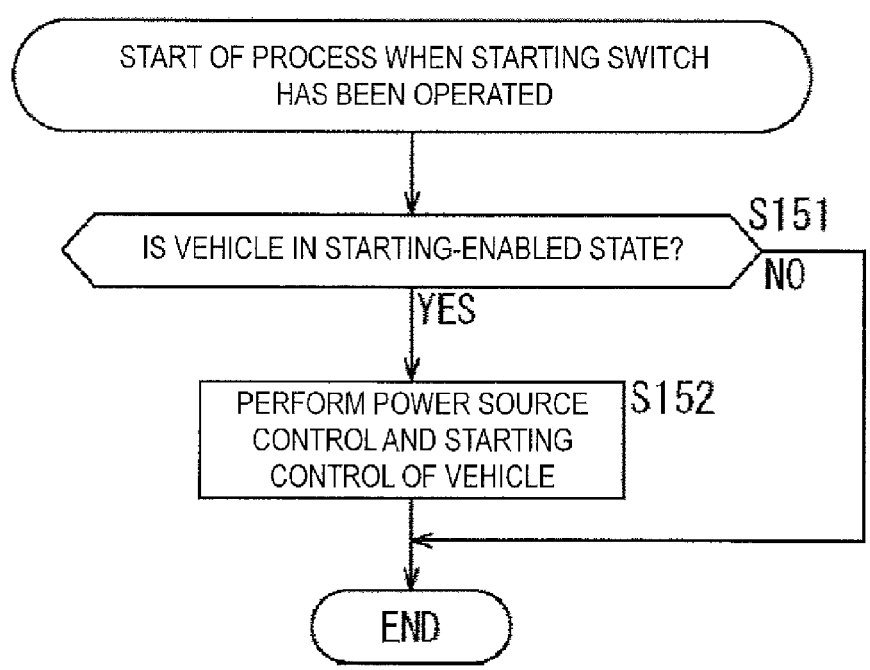
FIG. 8 is a flowchart illustrating a process of an in-vehicle system when a starting switch has been operated.

Next, the process of the in-vehicle system 111 when the starting switch of the vehicle 102 has been operated will be described with reference to the flowchart in FIG. 8. This process, for example, is started when the user operates the starting switch included in the operating part 112 and notifies the ECU 121 of information representing operation contents.

In step S151, the vehicle control part 213 determines whether the vehicle 102 is in the starting-enabled state. When the vehicle 102 is set in the starting-enabled state according to the process of step S105 of FIG. 7 or the like, the vehicle control part 213 determines that the vehicle 102 is in the starting-enabled state, and the process proceeds to step S152.

In step S152, the ECU 121 performs power source control and starting control of the vehicle 102. For example, the power supply control part 212 causes the supply of an accessory power source and an ignition power source of the vehicle 102 to be started. In addition, when the portable device 113 or the portable terminal 114 is placed on the charging pad 123, the power supply control part 212 causes charging power to be supplied from the power supply part 252 of the charging pad 123 to the portable device 113 or the portable terminal 114. Thereby, charging of the battery 307 of the portable device 113 or the battery 357 of the portable terminal 114 is started.

In addition, the vehicle control part 213 transmits a starting command to the engine (engine vehicle, hybrid car, or the like) of the vehicle 102, an ECU which controls a motor (an electric vehicle or the like), or the like. Thereby, the engine or motor of the vehicle 102 is started.

Thereafter, the process ends.

On the other hand, when it is determined that the vehicle 102 is not in the starting-enabled state in step S151, the process of step S152 is skipped and the process ends.

When the operation of the starting switch is not performed within a predetermined time after the vehicle 102 is set in the starting-enabled state, the state may be configured to be released. Further, the ECU 121 may be configured to attempt to re-acquire the vehicle operation information from the portable device 113 or the portable terminal 114, and reset the vehicle 102 to the starting-enabled state when the re-acquisition has succeeded.

As described above, even when a plurality of portable devices or physical keys (reserve keys) are not prepared, a plurality of users can use one vehicle according to an easy operation. In addition, because a user having a portable device or physical key is limited, the possibility of loss of the portable device or reserve key is low.

In addition, it is possible to prevent a malicious third-party from obtaining vehicle operation information and operating the vehicle by improving security using a password or authentication information.

Further, because the charging of the portable terminal 114 is started after the authentication of the portable terminal 114 has succeeded and the starting switching has been operated, the portable terminal chargeable by the charging pad 123 can be limited to the portable terminal 114 having normal vehicle operation information.

<2. Modified Examples>

Hereinafter, the modified examples of the above-described embodiments will be described.

[Modified Example of Operation Using Portable Device 113 or Portable Terminal 114]

For example, even when the portable device 113 has been placed on the charging pad 123, like when the portable terminal 114 has been placed on the charging pad 123, the portable device 113 may be configured to communicate with the ECU 121 via the charging pad 123 and enable the vehicle 102 to be started.

In addition, the portable device 113 may be configured to perform operations such as keyless entry, passive entry, and passive start by performing near-field wireless communication as well as wireless communication with the ECU 121.

Further, the portable terminal 114 can be configured to perform the passive start by directly performing near-field wireless communication with the ECU 121 without involving the charging pad 123.

In addition, the operation of the vehicle 102 rather than the starting of the vehicle 102 or the locking/unlocking of the door may be configured to be performed using the portable terminal 114. For example, when the authentication of the portable terminal 114 has succeeded after the portable terminal 114 has been placed on the charging pad 123, the transmission and reception of various information between the portable terminal 114 and the ECU 121 may be configured to be enabled via the charging pad 123. For example, the transmission of information (for example, music information or map information for updating a car navigation system or the like) for use in the vehicle 102 from the portable terminal 114 to the ECU 121 or the transmission of information (for example, failure diagnosis information, fuel consumption information, or the like) regarding the state of the vehicle 102 from the ECU 121 to the portable terminal 114 may be configured to be enabled. The transmission and reception of information between the portable terminal 114 and the ECU 121 can be configured to be performed without involving the charging pad 123.

[Function Limitation, Etc., when Operation of Vehicle 102 is Performed Using Portable Terminal 114]

For example, the vehicle operation information (hereinafter referred to as original vehicle operation information) to be directly transmitted from the portable device 113 to the vehicle 102 may be configured to be distinguished from the vehicle operation information (hereinafter referred to as copied vehicle operation information) transmitted from the portable terminal 114 to the vehicle 102 after transmission from the portable device 113 to the portable terminal 114, and a difference between functions capable of being implemented may be configured to be provided.

For example, an effective period or the effective number of times may be configured to be set in the copied vehicle operation information. For example, it is possible to set a specific time (for example, 6 hours) or a date (for example, until 21:00 tomorrow) or set a period until a predetermined condition is established (for example, a period until the starting of the vehicle 102 or the locking/unlocking of the door is performed using the original vehicle operation information the next time) as the effective period.

In addition, for example, it is possible to set the specific number of times (for example, 10) in which the locking/unlocking of the door or the starting of the vehicle 102 can be performed using the copied vehicle operation information as the effective number of times. Further, the effective number of times may be configured to be individually set for every type of operation and to be collectively set in all operations.

For example, when the copied vehicle operation information is transmitted from the portable device 113 to the portable terminal 114, the effective period or the effective number of times may be configured to be set by the user from the portable terminal 114 or to be automatically set. In addition, for example, when the copied vehicle operation information is transmitted to a plurality of portable terminals, a value of the effective period or the effective number of times may be configured to be changed for every terminal.

In addition, the determination of the effective period or the effective number of times when the copied vehicle operation information is used may be configured to be made by the side of the portable terminal 114 (for example, the vehicle control part 312) and by the side of the ECU 121 (for example, the vehicle control part 213).

Further, when the vehicle 102 has been started using the copied vehicle operation information compared to when the vehicle 102 has been started using original vehicle operation information, a function available after the starting of the vehicle 102 may be limited. For example, when the vehicle 102 has been started using the copied vehicle operation information, it is possible to prevent an electronic toll collection (ETC) system from being used.

For example, when the copied vehicle operation information is transmitted from the portable device 113 to the portable terminal 114, contents of a limited function may be configured to be set by the user from the portable terminal 114 or to be automatically set. In addition, for example, when the copied vehicle operation information is forwarded to a plurality of portable terminals, function limitation contents may be configured to be varied for every terminal.

[Modified Example Associated with Security Solution]

For example, the use of copied vehicle operation information by the side of the vehicle 102 may be configured to be prevented in consideration of the case in which a malicious person acquires the copied vehicle operation information and the like. For example, the use may be inhibited using the portable device 113 or by directly operating the operating part 112 of the vehicle 102 or may be inhibited according to a remote operation by providing a communication device, which performs far-field communication using an Internet line, a telephone line, or the like, in the vehicle 102.

In addition, although an authentication password has been configured to be inputted on the side of the portable terminal 114 as a security solution when the copied vehicle operation information is forwarded from the portable device 113 to the portable terminal 114 in the above description, the password may be configured to be inputted on the side of the portable device 113. In addition, for example, the input of the password may be configured to be omitted by automatically transmitting the password stored in the side of the portable terminal 114. Further, the authentication of the portable terminal 114 may be performed according to a method other than the password, for example, according to biometric authentication such as face authentication or fingerprint authentication.

[Modified Example Associated with Charging Control]

Figure 7:
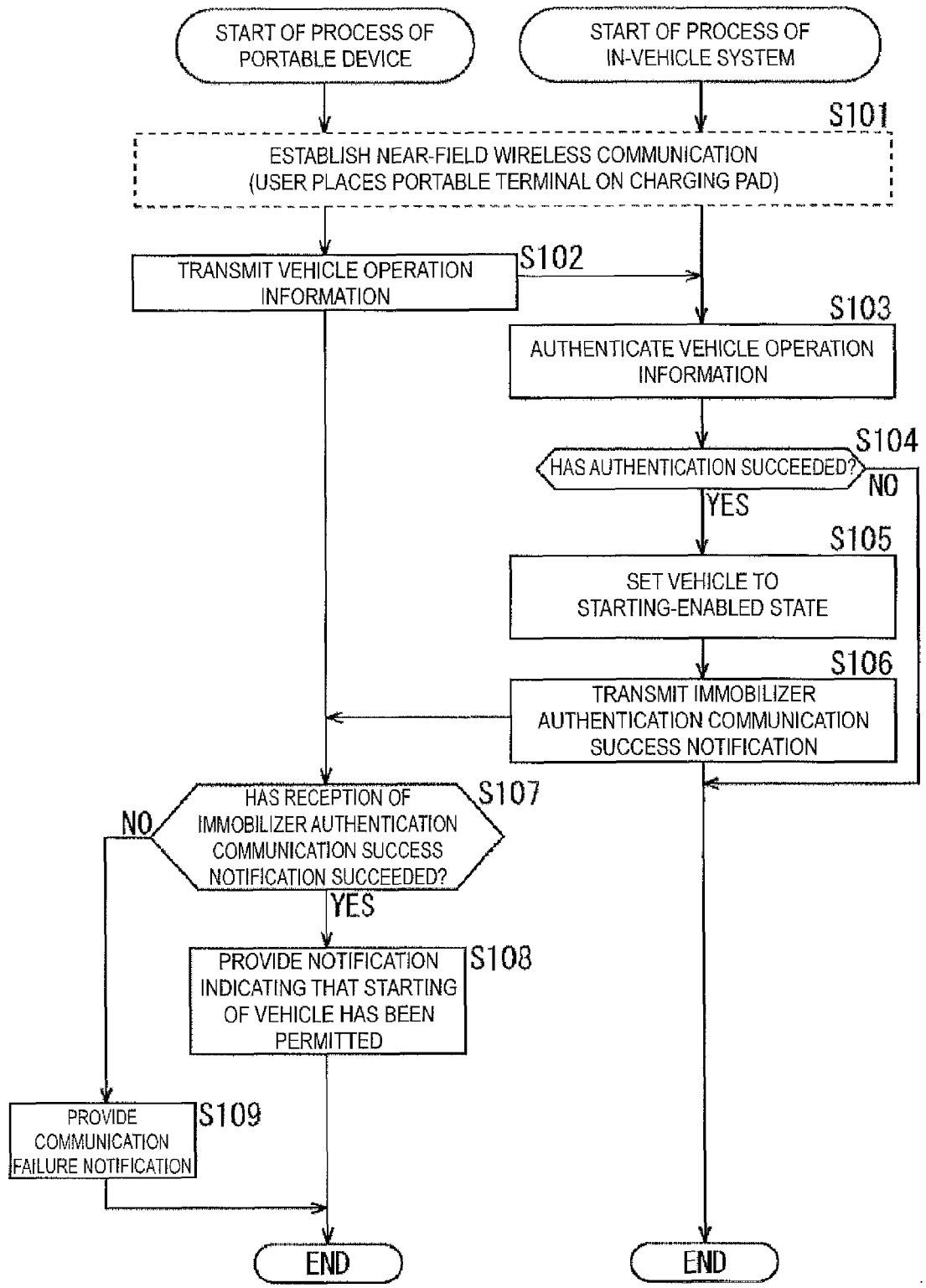
FIG. 7 is a flowchart illustrating a process when the vehicle can be started using the portable terminal.

For example, when the authentication of the portable terminal 114 has succeeded in the process of step S104 in FIG. 7, the supply of charging power from the power supply part 252 of the charging pad 123 to the portable terminal 114 may be configured to be started before the starting of the vehicle 102.

In addition, in this case, after the starting of the vehicle 102, charging power may be configured to be supplied from the power supply part 252 of the charging pad 123 to the portable terminal regardless of an authentication result of the portable terminal. Thereby, for example, a chargeable portable terminal may be configured to be limited before the starting of the vehicle 102 and not to be limited after the starting of the vehicle 102. Specifically, for example, after the vehicle 102 has been started by placing the portable terminal 114 having the normal copied vehicle operation information on the charging pad 123, charging can be performed by placing a portable terminal of a fellow passenger without the normal copied vehicle operation information on the charging pad 123.

In addition, the charging power may be configured to be constantly supplied from the power supply part 252 of the charging pad 123 to the portable terminal regardless of an authentication result of the portable terminal.

[Modified Example of Charging Pad 123]

For example, charging power may be configured to be directly supplied from the charging pad 123 to the portable terminal 114 or the like by providing a power source on the charging pad 123, and the charging pad 123 may be configured to control the supply of charging power from an external power supply to the portable terminal 114 or the like.

In addition, for example, a processor such as a CPU may be configured to be provided on the charging pad 123 and autonomously operated regardless of control of the ECU 121. In this case, for example, it is possible to adopt in-vehicle network communication of a controller area network (CAN) or the like in communication between the charging pad 123 and the ECU 121.

Further, for example, it is possible to use a contact charger instead of the charging pad 123. In this case, for example, it is possible to adopt a wired communication scheme instead of near-field wireless communication as a communication scheme of the charger.

[Modified Example Associated with Communication Scheme]

The types or number of near-field wireless communication schemes to be performed by the portable device 113, the portable terminal 114, the ECU 121, and the charging pad 123 are not limited to the above-described examples. Accordingly, for example, it is possible to change a near-field wireless communication scheme or change the number of mounted near-field wireless communication schemes. In addition, it is also possible to adopt wireless communication or wired communication other than near-field wireless communication according to a utility form or the like.

The above-described series of processes can be executed not only by hardware but also by software. When the above-described series of processes are executed by software, a program constituting the software is installed in a computer.

Here, the computer includes a computer in which dedicated hardware is embedded or, for example, a general-purpose computer or the like capable of executing various functions by installing various programs.

In addition, a program to be executed by the computer, for example, can be provided by recording the program on removable media serving as package media or the like. In addition, the program can be provided via a wired or wireless transmission medium such as a local area network, a CAN, the Internet, or a digital satellite broadcast.

In addition, the program to be executed by the computer may be a program of which processing is performed in time sequence in the order which is described in the present specification, or may be a program of which processing is performed in parallel, or at necessary timing when a call is made, or the like.

In addition, in the present specification, the system means a set of a plurality of components (a device, a module (part), or the like), and it is not important whether all of the constituent elements are in one same housing. Accordingly, any of a plurality of devices housed in a separate housing and connected via a network, and one device in which a plurality of modules are housed in one housing is the system.

In addition, the embodiments of the present invention are not limited to the above-described embodiments. Various modifications can be made within the scope of the present technology.

In addition, each step described in the above-described flowchart can be executed by one device and shared and executed by a plurality of devices.

Further, when a plurality of processes are included in one step, the plurality of processes included in the one step can be executed by one device and shared and executed by a plurality of devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An in-vehicle system comprising:
    a control device that controls a vehicle; and
    a charging device provided in the vehicle, in which a portable terminal is chargeable,
    wherein the charging device comprises:
        a power supply part that supplies power to the portable terminal; and
        a communication part that communicates with the portable terminal when the portable terminal is installed on the charging device, and
    wherein the control device comprises:
        an authentication part that authenticates first authentication information received by the communication part from the portable terminal; and
        a power supply control part,
    wherein the power supply control part controls power to be supplied from the power supply part to the portable terminal when the authentication of the first authentication information has succeeded before the vehicle is started, and
    wherein the power supply control part controls power to be supplied from the power supply part to the portable terminal regardless of the authentication result of the first authentication information after the vehicle is started.

2. The in-vehicle system according to claim 1,
    wherein the power supply part supplies power to the portable terminal in a non-contact form, and wherein the communication part performs near-field wireless communication with the portable terminal.

3. The in-vehicle system according to claim 1,
    wherein the control device further comprises a vehicle control part that controls whether to permit starting of the vehicle based on an authentication result of the first authentication information.

4. The in-vehicle system according to claim 3, wherein, in the case where the authentication of the first authentication information has succeeded, the vehicle control part outputs a command to start the vehicle when a predetermined operation has been performed on the vehicle.

5. The in-vehicle system according to claim 3,
    wherein the control device further comprises: a near-field wireless communication part that performs near-field wireless communication with the portable terminal,
    wherein the authentication part further authenticates the first authentication information received by the near-field wireless communication part from the portable terminal, and
    wherein the vehicle control part further controls locking or unlocking of a door of the vehicle based on an authentication result of the first authentication information.

6. The in-vehicle system according to claim 3,
    wherein the control device further comprises: a wireless communication part that wirelessly communicates with a dedicated portable device for the vehicle,
    wherein the authentication part further authenticates second authentication information received by the wireless communication part from the portable device, and
    wherein the vehicle control part further controls whether to permit the starting of the vehicle based on an authentication result of the second authentication information.

7. The in-vehicle system according to claim 6, wherein the vehicle control unit limits a function of the vehicle when the vehicle has been started according to the first authentication information compared to when the vehicle has been started according to the second authentication information.

8. The in-vehicle system according to claim 3,
    wherein the power supply part supplies power to the portable terminal in a non-contact form,
    wherein the communication part further performs the near-field wireless communication with the portable terminal and a dedicated portable terminal for the vehicle,
    wherein the authentication part further authenticates the second authentication information received by the communication part from the portable device, and
    wherein the vehicle control part further controls whether to permit the starting of the vehicle based on an authentication result of the second authentication information.

9. A method of controlling a vehicle comprising a control device that controls a vehicle and a charging device comprising a power supply part that supplies power to a portable terminal and provided in the vehicle in which the portable terminal is chargeable, the method comprising:
    communicating, by the charging device, with the portable terminal when the portable terminal has been installed and receiving authentication information from the portable terminal;
    authenticating, by the control device, the authentication information received by the charging device from the portable terminal;
    controlling, by the control device, power to be supplied from the power supply part to the portable terminal when the authentication of the first authentication information has succeeded before the vehicle is started; and controlling, by the control device, power to be supplied from the power supply part to the portable terminal regardless of the authentication result of the first authentication information after the vehicle is started.

10. A vehicle control system comprising:
a control device that controls a vehicle;
a charging device provided in the vehicle in which a portable terminal is chargeable;
and a dedicated portable device for the vehicle,
wherein the portable device comprises:
- a near-field wireless communication part that performs near-field wireless communication with the portable terminal and transmits first authentication information to the portable terminal, wherein the charging device comprises:
- a power supply part that supplies power to the portable terminal; and
- a communication part that communicates with the portable terminal when the portable terminal is installed on the charging device, and wherein the control device comprises:
- an authentication part that authenticates the first authentication information received by the communication part from the portable terminal; and
- a power supply control part, wherein the power supply control part controls power to be supplied from the power supply part to the portable terminal when the authentication of the authentication information has succeeded before the vehicle is started, and wherein the power supply control part controls power to be supplied from the power supply part to the portable terminal regardless of the authentication result of the authentication information after the vehicle is started.

11. The vehicle control system according to claim 10, wherein the control device further comprises the a vehicle control part that controls whether to permit starting of the vehicle based on an authentication result of the authentication information.

12. The vehicle control system according to claim 11, wherein the vehicle control part further controls whether to permit starting of the vehicle based on an effective period or an effective number of times set in the first authentication information.

13. The vehicle control system according to claim 12, wherein the effective period or the effective number of times is set when the authentication information is transmitted from the portable device to the portable terminal.

14. The vehicle control system according to claim 11,
wherein the power supply part supplies power to the portable terminal in a non-contact form, and
wherein the communication part performs near-field wireless communication with the portable terminal.

15. An in-vehicle system comprising:
a control device that controls a vehicle; and
a charging device provided in the vehicle in which a portable terminal is chargeable,
wherein the charging device comprises:
- a power supply part that supplies power to the portable terminal; and
- a communication part that communicates with the portable terminal when the portable terminal is installed on the charging device, and wherein the control device comprises:
- an authentication part that authenticates authentication information received by the communication part from the portable terminal; and
- a power supply control part, wherein the power supply control part controls power to be supplied from the power supply part to the portable terminal when the authentication of the authentication information has succeeded before the vehicle is started, and wherein the power supply control part controls power to be supplied from the power supply art to the portable terminal regardless of the authentication result of the authentication information after the vehicle is started.

* * * * *